Dec. 30, 1952  F. MUCIACCIA ET AL  2,623,481
CAR PROTECTOR
Filed March 9, 1951
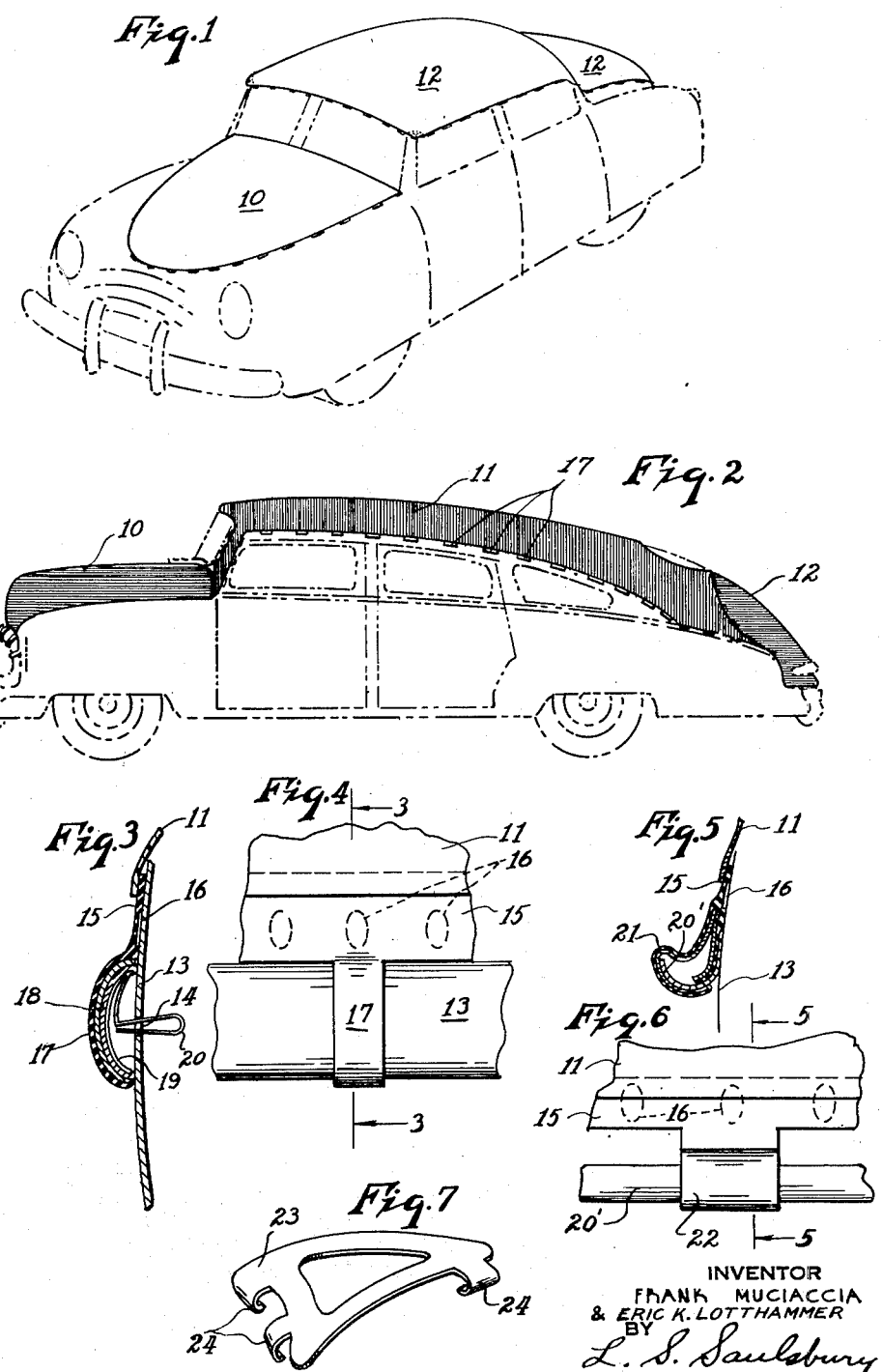
INVENTOR
FRANK MUCIACCIA
& ERIC K. LOTTHAMMER
BY
L. S. Saulsbury
his ATTORNEY Patented Dec. 30, 1952

2,623,481

UNITED STATES PATENT OFFICE 2,623,481

CAR PROTECTOR

Frank Muciaccia, Hoboken, N. J., and Eric K. Lotthammer, Jamaica, N. Y.; said Lotthammer assignor to said Muciaccia Application March 9, 1951, Serial No. 214,738

6 Claims. (Cl. 108—3)

This invention relates to vehicles, such as automobiles, and more particularly to protective covers for various parts thereof, such as the engine roof, the top or roof and the trunk compartment.

The principal object of the invention is the production of a cover of the above character which may be easily applied to the part to be covered and which shall be supplied with detachable fastening means of simplicity of construction for retaining the cover against displacement and in proper position on the covered part.

Other and further objects and advantages of the invention will appear from the accompanying description taken in connection with the annexed drawing, the invention consisting in the novel cover for automobiles and the like hereinafter more particularly described and then specified in the claims.

In the accompanying drawing illustrating a practical embodiment of the invention:

Fig. 1 is a perspective view of an automobile showing the cover of the invention as applied to various of the parts thereof.

Fig. 2 is a side elevation of Fig. 1.

Fig. 3 is a vertical cross-section on the line 3—3 of Fig. 4.

Fig. 4 is an enlarged front elevation of a fragmentary portion of the invention.

Fig. 5 is a vertical cross-section on the line 5—5 of Fig. 6.

Fig. 6 is a view similar to Fig. 4 but showing a modification of the invention.

Fig. 7 is a perspective view of a clamp which may be used in the corner of one of the cover parts or sections and which assists in holding the cover part in proper position.

It is preferred to construct the cover parts or sections of a thermoplastic material known as "Plastovin" which may be made in a variety of colors and which may be either transparent or opaque. The advantages of this material are that it is tough, is resistant to the action of both acids and alkalis, is heat sealable, is resistant to ageing, sunlight and heat, is flexible over wide ranges of temperature, is dimensionally stable and has excellent flexural characteristics and tear resistance.

Referring in detail to the several figures of the drawing, 10, 11 and 12 indicate the protective cover parts as applied to the hood, top or roof and rear trunk compartment respectively of an automobile. These cover parts may be constructed of a thermoplastic flexible material of the character just described or of a material having substantially similar characteristics. The invention will be described in the interest of simplicity of explanation with respect to the cover 11 for the top or roof of the automobile, it being understood that the construction so described is applicable to the cover parts 10 and 12.

A portion of the enamelled metallic automobile body is indicated at 13 and may comprise specifically the overhanging sides or ends of the top or roof thereof. The cover 11 is tailored as to size and configuration to fit substantially over the entire outer surface of said top or roof excepting only that portion of the sides or ends which are provided with a plurality of spaced openings 14 which are drilled or otherwise formed therein. The edges of the cover 11 have an elastic, rubber-like band or strip 15 secured thereto by a bonding cement and the inner side of said band or strip is provided with a plurality of spaced concavities or depressions 16 providing suction cups which act by suction action to assist in retaining said band or strip in engagement with the body part 13.

The elastic rubber-like band or strip 15 is so formed as to provide a plurality of spaced and rounded and downwardly-extending coatings or extensions 17 integral therewith and each covering and cemented to a hollow and curved and rigid metallic supporting strip 18, the free edges of which are spaced from each other and are adapted to engage the face of the body part 13. Each supporting strip 18 receives and supports a metallic spring body 19 to which it may be connected in any desirable manner. A portion of said spring body is so formed or bent as to provide a laterally and outwardly-extending expansible spring clip 20 under spring tension and adapted to be detachably inserted within one of the openings 14 hereinbefore referred to. The cover 11 thus is firmly and detachably held in proper position assisted by the action of the suction cups 16.

In the modification of Figs. 5 and 6, 20' indicates the conventional U-shaped rain or water channel which is attached to or forms a part of the overhanging edge of the roof or top of the automobile body. A metallic spring-like retaining clip or member 21 under tension is covered and carried by a rubber-like extension 22 of the band or strip 13 with which it is preferably integral and said retaining clip and extension are securely cemented together. The spring clip is provided with overlapping spaced ends as shown whereby to receive the edge of the channel 20'. It is then moved to a position whereby it engages and firmly clamps the channel beneath the same. A plurality of said retaining clips spaced from each other are provided as in the preferred form of the invention.

Fig. 7 shows a generally triangularly-shaped gripping member or clamp 23 which may be held within a pocket (not shown) provided in a corner of the cover 11. Said member is provided with claws 24 adapted to grip adjacent sides of the top or roof of the automobile and assist in retaining the cover in proper position thereon.

Various modifications may be made without departing from the spirit of the invention as defined in the appended claims.

What is claimed is:

1. A cover for covering a part of the metallic body of an automobile and the like consisting of a flexible sheet of material, an elastic rubber-like strip of material cemented to said flexible sheet of material and provided with a concavity in its inner side forming a suction cup for engagement with said body part and a spring clip under tension carried by said elastic strip and adapted to detachably engage the body part to hold said sheet of material tightly thereon.

2. A cover for covering a part of the metallic body of an automobile and the like consisting of a flexible sheet of material, an elastic rubber-like strip of material cemented to said flexible sheet adjacent an edge thereof and provided with a concavity in its inner side forming a suction cup for engagement with said body part, an extension integral with said strip and a spring clip under tension coated and carried by said extension and adapted to detachably engage the body part to hold said sheet of material tightly thereon.

3. A cover for covering a part of the metallic body of an automobile and the like consisting of a flexible sheet of material, an elastic rubber-like strip of material cemented to said flexible sheet adjacent an edge thereof and provided with a plurality of spaced concavities in its inner side forming suction cups for engagement with said body part, a plurality of spaced depending extensions integral with said strip and a plurality of spring metal clips under tension each carried and coated by one of said extensions and adapted to detachably engage the body part to hold said sheet of material tightly thereon.

4. A cover for covering a part of the metallic body of an automobile and the like, said body part being provided with an opening therein, comprising a flexible sheet of material, an elastic rubber-like strip of material cemented to said flexible sheet and provided with a concavity in its inner side forming a suction cup for engagement with said body part, a curved and rigid hollow spring-supporting element attached to said strip and a spring positioned within and supported by said element and having a tensioned end portion adapted to extend within the opening in said body part to hold said sheet of material on said body part.

5. A cover for covering a part of the metallic body of an automobile and the like, said body part being provided with an opening therein, comprising a flexible sheet of material, an elastic strip of material cemented to said flexible sheet and provided with a concavity in its inner side forming a suction cup for engagement with said body part, a curved and rigid spring-supporting element having spaced free ends engaging said body part, said element being covered by and cemented to said strip, and a spring engaging the curved wall of said supporting element and provided with a tensioned bent-over end entering said opening to hold said sheet of material on said body part.

6. A cover for covering the roof of an automobile body which is provided with a U-shaped water channel on the overhanging edge of said roof, comprising a flexible sheet of material engaging said roof, an an elastic rubber-like strip of material cemented to said flexible sheet adjacent to an edge thereof and provided with a concavity in its inner side forming a suction cup for engagement with said body part and a spring under tension covered and carried by said strip and detachably engaging said U-shaped channel to hold said sheet of material on said roof.

FRANK MUCIACCIA.
ERIC K. LOTTHAMMER.

REFERENCES CITED

The following references are of record in the file of this patent:

UNITED STATES PATENTS

| Number | Name | Date |
|---|---|---|
| 2,479,825 | Fleischhauer | Aug. 23, 1949 |